Jan. 26, 1932.   N. W. BIGGS   1,842,652
EXPANSIBLE CORE AND METHOD OF MAKING THE SAME
Filed May 17, 1930
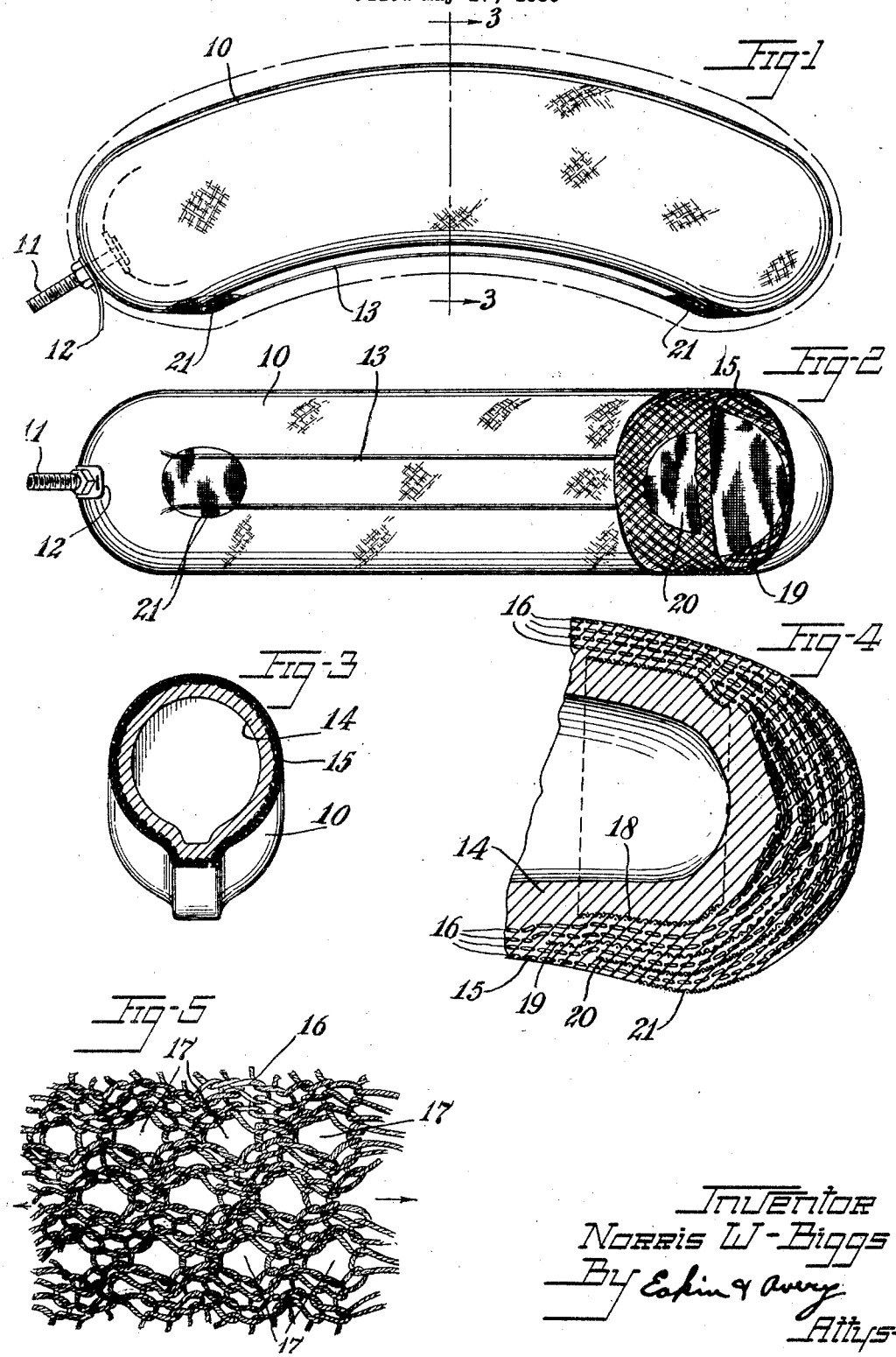

Patented Jan. 26, 1932

1,842,652

UNITED STATES PATENT OFFICE

NORRIS W. BIGGS, OF AKRON, OHIO, ASSIGNOR TO THE B. F. GOODRICH COMPANY, OF NEW YORK, N. Y., A CORPORATION OF NEW YORK

EXPANSIBLE CORE AND METHOD OF MAKING THE SAME

Application filed May 17, 1930. Serial No. 453,178.

This invention relates to expansible cores and methods of making the same and more especially it relates to sectional expansible cores such as are used for repairing pneumatic tire casings by forcing a local region thereof outwardly against a mold or suitable wrappings while it is vulcanized.

Treatment of the work requires expansion of the core only in a radial direction and the ends of a repair core, when mounted for operation within a tire, are unconfined. Many cores of the types heretofore provided have been insufficiently stretchable radially and have so elongated under internal pressure as to exert a drag upon the tire material and by displacing it causing an imperfect repair.

The chief objects of the invention are to provide an expansible core which will expand readily at relatively low internal pressure; to provide an expansible core in which the radial expansion is substantially uniform from one end to the other; to provide a structure of the character mentioned which will expand without imposing longitudinal strain upon its constituent reinforcing members; to provide an expansible core having good recovery when deflated; to obviate material permanent elongation in service; to provide an expansible core of sufficient radial expansibility to permit it to be used in tires of different sizes; to provide for facility and economy in the manufacture of expansible cores; to provide a core having relatively long life; to provide a core adapted to withstand high internal pressure when distended either outside or inside of a tire; and to provide a method of making such a core.

Of the accompanying drawings:

Fig. 1 is a side elevation of my improved expansible core in its preferred form.

Fig. 2 is a bottom view of the structure shown in Fig. 1, a part thereof being broken away.

Fig. 3 is a section on line 3—3 of Fig. 1.

Fig. 4 is a longitudinal section, on a larger scale, of one end portion of the core.

Fig. 5 is a plan view, on a greatly enlarged scale, of one of the fabric elements incorporated in the core.

Referring to the drawings, the core comprises a tubular, arcuate, structure 10 of rubber and fabric and having rounded closed ends in one of which is mounted a valve stem 11 by which pressure fluid is admitted to the interior of the core to distend the core in a radial direction with relation to its arcuate longitudinal axis. A slotted plate 12 may be mounted upon the valve stem 11 to provide attaching means for a suitable bail (not shown) by which the core may be readily handled. The structure 10 is of uniform wall-thickness throughout except at its ends, which are thicker due to additional reinforcement. In transverse section the core is shaped to conform to the interior contour of a pneumatic tire casing (see Fig. 3) and along its bottom is an offset portion 13 adapted to fit between the bead portions of a tire.

The structure 10 comprises an inner body portion 14 of vulcanized rubber, and reinforcement consisting of a surface covering of rubberized fabric 15, the assembly being vulcanized into a unitary structure having a smooth exterior surface.

The fabric which constitutes the major portion of the reinforcement of the core, and which imparts thereto the characteristics of relatively great radial extensibility and relatively small longitudinal extensibility, is shown at 16, Fig. 5. This is a knitted fabric known by the trade name of "Tricot". Referring to Fig. 5, wherein the arrows are directed longitudinally of the fabric, it will be seen that all the strands of the fabric extend transversely thereof, and are so interlooped with each other as to define interstitial figures or apertures 17, 17 which are somewhat irregular in shape, and are arranged in parallel rows longitudinally of the sheet of fabric, the apertures of each row being offset or staggered with relation to those of the adjacent rows. The fabric is extensible in all directions, but its extensibility is greatest in the longitudinal and directly transverse directions.

The fabric 16 is given a coat of unvulcanized rubber composition on both sides before it is mounted upon the hollow rubber body 14, and during the coating operation, the rubber is applied thereto while the fabric is held under longitudinal tension to reduce its longitudinal stretchability in the finished article.

The rubber-coated fabric 16 is cut into pieces of suitable size to cover the core body 14, and a plurality of plies of the fabric, four as shown in Fig. 4, are mounted thereon, the fabric at the ends of the structure preferably being slit longitudinally and so overlaid around the end of the core as to provide additional thicknesses of reinforcement thereat as shown. End-caps 18 consisting of circumferential plies of square-woven fabric are incorporated in the respective end portions of the core to provide additional reinforcement thereat, the strands of the fabric being disposed longitudinally and transversely of the core so as to render the end portions thereof practically inextensible. Similarly disposed inserts 19, 20, 21 of square-woven fabric are mounted in the core structure adjacent the ends thereof on the under side of the core to strengthen the core at the zones of greatest strains.

The fabric 16 is mounted on the core with the lines of stretch previously given it disposed longitudinally of the core, and the assembled structure is vulcanized in a mold in the usual manner. The fabric 16 imparts to the core its own characteristics. Being previously elongated longitudinally, the fabric is capable of but slight additional elongation in the same direction. In a radial direction with relation to the core, which is transversely of the fabric, the latter is capable of being distended extensively even by relatively low internal pressure in the core, the distension of the fabric being accompanied by the opening up of the spaces 17. Thus in the radial distension of the core there is no such longitudinal strains imposed upon the respective strands of the fabric 16 as to rupture the same, or to cause permanent elongation thereof and thus to cause permanent enlargement of the core.

Experience has shown that a core of the character described elongates only about 3 per cent when confined in a tire and inflated to 70 pounds pressure. Its radial extensibility is relatively high and it is possible to use a single core for repairing tires of several different sizes. Because of the easy extensibility of the core, less of the internal pressure therein is absorbed by the core itself so that it is possible to exert satisfactory pressure on the work with but 45—50 pounds fluid pressure within the core. This is a decided advantage and economy over other expansible core structures which require as much as 75 pounds internal pressure properly to distend them, and results in longer life of the cores using the lower pressures.

Expansible cores reinforced with the knitted fabric described, when inflated, will expand radially substantially uniformly from end to end of the core, as indicated by the broken lines in Fig. 1, with the result that uniform pressure is applied to all parts of the work being treated.

The invention is susceptible of modification within the scope of the appended claims, as I do not limit the claims wholly to the specific construction shown or exact procedure described.

I claim:

1. The method of making expansible articles which comprises forming a hollow structure of vulcanizable material, tensioning a length of textile material, applying the tensioned material to the hollow structure, and then vulcanizing the assembled structure while the material remains under tension.

2. The method of making an expansible core which comprises forming a hollow structure of vulcanizable material, distorting the normal weave of a length of fabric and mounting it upon the said structure, and then vulcanizing the structure thus formed while the fabric is held with its weave distorted.

3. The method of making an expansible core which comprises forming an elongate, hollow, closed container of vulcanizable material, distorting the normal weave of a length of fabric by applying tension thereto in one direction, applying the fabric while so distorted to the hollow container with the lines of tension therein extending longitudinally of the container, and then uniting the respective parts of the assembled structure by vulcanization.

4. The method of making an expansible core which comprises forming a hollow container of vulcanizable material, tensioning a length of fabric in a longitudinal direction, applying the fabric while so tensioned to the receptacle, and incorporating it therein by vulcanization.

5. A method as defined in claim 4 including applying unvulcanized rubber to the tensioned material to hold it in distorted condition before its application to the container.

6. An expansible repair core comprising a hollow structure of fabric and vulcanized rubber adapted to receive fluid under pressure, the fabric therein having its weave distorted with relation to its normal arrangement.

7. An expansible core adapted to receive fluid under pressure, said core comprising an elongate vulcanized rubber structure reinforced with knitted fabric, said fabric being under tension in one direction only.

8. An expansible core adapted to receive fluid under pressure, said core comprising an elongate vulcanized rubber structure reinforced with knitted fabric, said fabric being under tension longitudinally of the structure.

9. An expansible repair core adapted to be positioned within a tire casing and to receive fluid under pressure, said core comprising a vulcanized rubber structure reinforced with fabric which is under tension in a longitudinal direction with relation to the tire.

In witness whereof I have hereunto set my hand this 13th day of May, 1930.

NORRIS W. BIGGS.